(12) United States Patent
Li et al.

(10) Patent No.: US 8,770,132 B2
(45) Date of Patent: Jul. 8, 2014

(54) MARINE WIND TURBINE WHOLE MACHINE

(76) Inventors: Aidong Li, Nantong (CN); Hongyan Ding, Nantong (CN); Xuanxu Huang, Nantong (CN)

(*) Notice: Subject to any disclaimer, the term of this patent is extended or adjusted under 35 U.S.C. 154(b) by 0 days.

(21) Appl. No.: 13/380,688

(22) PCT Filed: Jul. 12, 2010

(86) PCT No.: PCT/CN2010/001034
§ 371 (c)(1),
(2), (4) Date: Dec. 23, 2011

(87) PCT Pub. No.: WO2011/097779
PCT Pub. Date: Aug. 18, 2011

(65) Prior Publication Data
US 2013/0098282 A1    Apr. 25, 2013

(51) Int. Cl.
*B63B 35/44* (2006.01)
(52) U.S. Cl.
USPC .............................. 114/264; 405/227; 405/205
(58) Field of Classification Search
USPC ................ 405/210, 227, 205; 114/264, 45
See application file for complete search history.

(56) References Cited

U.S. PATENT DOCUMENTS

| | | | | |
|---|---|---|---|---|
| 3,426,109 | A * | 2/1969 | Dempster | 264/34 |
| 4,015,554 | A * | 4/1977 | Chow | 114/65 R |
| 5,582,491 | A * | 12/1996 | Pardue, Sr. | 405/224 |
| 6,244,785 | B1 * | 6/2001 | Richter et al. | 405/195.1 |
| 6,665,990 | B1 * | 12/2003 | Cody et al. | 52/295 |
| 6,666,624 | B2 * | 12/2003 | Wetch | 405/205 |
| 6,860,219 | B1 * | 3/2005 | Dempster | 114/264 |
| 7,726,911 | B1 * | 6/2010 | Dempster | 405/210 |
| 8,215,874 | B2 * | 7/2012 | Reeves | 405/255 |
| 8,388,267 | B2 * | 3/2013 | Breaux et al. | 405/227 |
| 2003/0140838 | A1 * | 7/2003 | Horton, III | 114/264 |
| 2012/0073487 | A1 * | 3/2012 | Pantaleon Prieto et al. | 114/264 |
| 2013/0098282 | A1 * | 4/2013 | Li et al. | 114/264 |

* cited by examiner

*Primary Examiner* — Lars A Olson
*Assistant Examiner* — Jovon Hayes
(74) *Attorney, Agent, or Firm* — Cesari and McKenna, LLP

(57) ABSTRACT

The present invention provides an offshore wind turbine complete set, comprising a foundation, a tower column and a wind turbine set. The foundation utilizes a steel-concrete structure and comprises a plurality of tanks which are respectively provided with an opening; a lower end of the tower column is installed on the foundation; and the wind turbine set is installed on an upper end of the tower column. When the offshore wind turbine complete set floats on water, the openings of the plurality of tanks are under the water, and the tank is injected with air or water, and the buoyancy and uprighting force are provided by the plurality of tanks, so as to keep the entire structure in a vertical floating state consistent with the state of installation on the offshore site, but without external force on the water. The use of the offshore wind turbine complete set of the present invention eliminates the need for large hoisting machinery and transportation vessels in the offshore operation, the operation can be easily performed with high ratio of success, and greatly reduces the cost. Moreover, the technical solutions of the present invention have advantages such as low construction noise, small area of sea bed disturbance, and no pollutant leakage during the offshore operation and are environment-friendly.

10 Claims, 1 Drawing Sheet

MARINE WIND TURBINE WHOLE MACHINE

TECHNICAL FIELD

The present invention relates to techniques for an offshore wind turbine, and especially to an offshore wind turbine complete set.

BACKGROUND

In nature, wind energy is an energy source that is renewable, pollution-free and of large reserves. Along with global warming and energy crisis, development and utilization of wind energy are sped up to minimize the discharge of greenhouse gases such as carbon dioxide in various countries, so as to protect the earth we live upon. Utilization of wind energy is mostly in forms of wind power and wind power generation, in which the wind power generation is predominant.

Currently, an offshore wind turbine set comprises four parts: a foundation, a tower column, a wind turbine head and blades, which are transported to the offshore construction site by a transportation vessel and are separately constructed and installed, and the test of the complete set is finished. Structure type employed by the offshore wind turbine foundation in construction is generally mono-pile foundation, multi-pile foundation, gravity type and jacket type foundations. Methods of Installation include sectional hoisting and complete hoisting and so forth. The test is generally performed using offshore test, which results in a series of technical issues, for example, the transportation and installation of the offshore wide turbine set can not realize the integration, there is a interface between the transportation and the installation, and the construction in the shallow water is difficult, which increase the investment cost on the offshore wind turbine foundation construction in a larger degree than on the onshore foundation, thereby limiting the development of offshore wind power.

With reference to Chinese Invention Patent Application Publication No. CN101169108A, published on Apr. 30, 2008, which discloses an offshore wind turbine tower with structure of an integral design of wind tower foundation and the wind turbine tower frame and the generating set. The offshore construction of the offshore wind turbine tower is completed with a one-step installation of the whole wind turbine tower. The offshore wind turbine tower of the present invention has a bottom that is mono-cylinder suction anchor foundation or multi-cylinder suction anchor foundation, and a ballast tank is provided on the top of the suction anchor which adjusts the center of gravity of the entire offshore wind turbine tower by filling steel emery therein, and controls the center of gravity of the entire wind turbine tower on the suction anchor foundation, so as to readily reverse the wind turbine tower under the gravity from a horizontal position to a vertical state for the convenience of sinking during installation. However, the wind turbine set is stored in a toppled state during transportation which is different from the state during use of the wind turbine set, and possibly causes damage to the precise wind turbine set. In addition, when the large scale posture transition from a vertical posture to a horizontal posture is performed, it not only requires higher structural strength of the wind turbine tower but also needs large specific equipments for operation and is possibly even inoperable for a large wind turbine tower.

Therefore it is necessary to make improvement to overcome the existing technical problems.

SUMMARY OF THE INVENTION

The present invention is to solve the problem that for transportation, installation and dismounting of the existing offshore wind turbine, period of the offshore execution is long, and the execution is with big difficulty and high cost.

In order to solve the problems above, the present invention provides technical solutions as follows.

Solution 1: An offshore wind turbine complete set, comprising:

a foundation, utilizing a steel-concrete structure and comprising a plurality of tanks which are respectively provided with an opening;

a tower column, a lower end of which is installed on the foundation; and a wind turbine set, which is installed on an upper end of the tower column;

wherein the openings of the plurality of tanks are under the water when the offshore wind turbine complete set floats on water, and the tanks are injected with air or water, and the buoyancy and uprighting force are provided by the plurality of tanks, so as to keep the entire structure in a vertical floating state on the water consistent with the state of installation on the offshore site, but without external force.

Solution 2: The offshore wind turbine complete set according to any one of the above solution, wherein each of the plurality of tanks is provided with a switchable through hole through or from which the air may be injected or released, so as to control the negative pressure of each tank.

Solution 3: The offshore wind turbine complete set according to any one of the above solutions, wherein the plurality of tanks comprise one middle tank and a plurality of side tanks, the plurality of side tanks being further away from the center of gravity of the offshore wind turbine complete set than the middle tank.

Solution 4: The offshore wind turbine complete set according to any one of the above solutions, wherein the volume of the middle tank is larger than that of each side tank, and the center of gravity of the offshore wind turbine complete set lies in the center of the middle tank.

Solution 5: The offshore wind turbine complete set according to any one of the above solutions, wherein the plurality of tanks comprise a middle tank and four side tanks, with the cross section of the middle tank being square and the four side tanks being symmetrically distributed around the middle tank.

Solution 6: The offshore wind turbine complete set according to any one of the above solutions, wherein the foundation is columnar in its entirety, with the ratio of its diameter to the height of the offshore wind turbine complete set not less than 0.2.

Solution 7: The offshore wind turbine complete set according to any one of the above solutions, wherein the foundation is columnar in its entirety, with the cross section being polygonal and the ratio of the polygonal span to the height of the offshore wind turbine complete set not less than 0.2.

Solution 8: The offshore wind turbine complete set according to any one of the above solutions, wherein the foundation is cylindrical, and the center upside a cover of the foundation is fixed with a pile cap, an upper end of which is provided with an adapter ring by which the lower end of the tower column is installed on the pile cap.

Solution 9: The offshore wind turbine complete set according to any one of the above solutions, wherein the foundation is provided with wave-resistant and ice-breaking structures in the position of its pile cap, so as to weaken the influence of wave run-up and ice on the foundation.

Solution 10: The offshore wind turbine complete set according to any one of the above solutions, wherein a ballast tank is provided inside the pile cap.

Solution 11: The offshore wind turbine complete set according to any one of the above solutions, wherein the tower column employs a hollow steel-concrete structure.

Solution 12: The offshore wind turbine complete set according to any one of the above solutions, wherein internal and external surfaces of the foundation are further provided with a plurality of kinds of pressure sensors.

It is possible to realize one-step installation and dismounting for the complete set using the offshore wind turbine complete set of the present invention, which eliminates the need for large hoisting machinery and transportation vessels in offshore operation for the large offshore wind turbine complete set, the operation can be easily performed with high ratio of success, and greatly reduces the cost relative to the existing technique of installation. Since the foundation, the tower column and the wind turbine set remain in the same posture from fabrication and transportation to use, which minimizes the risk of damage on each components of the wind turbine, and thus lowers the requirements for structural resistance to damage and reduces the cost of fabrication. Moreover, the technical solutions of the present invention further have advantages such as low construction noise, small area of sea bed disturbance, and no pollutant leakage during the offshore operation and are environment-friendly.

DESCRIPTION OF THE DRAWINGS

The present invention will become more apparent with reference to the detailed description of the preferred embodiments along with the accompanied drawings, the same numeral references represent the same parts in the drawings, in which.

DESCRIPTION OF THE EMBODIMENTS

Figure 1:
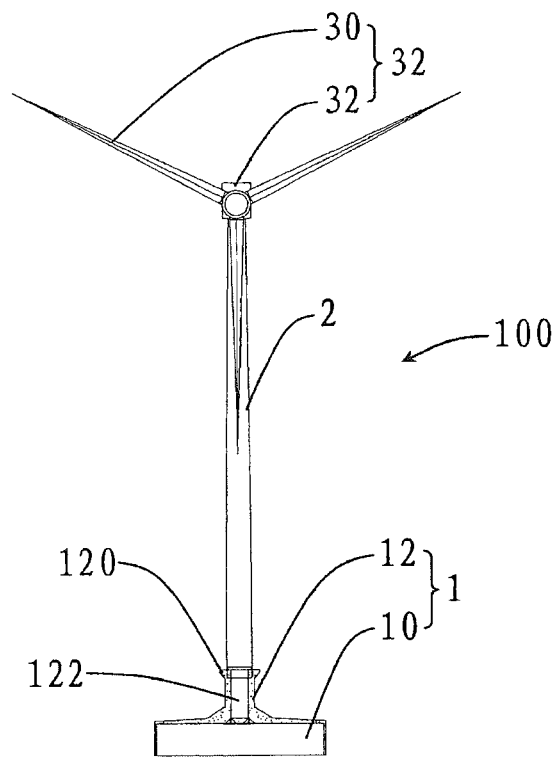
FIG. 1 is a front structural schematic view of an offshore wind turbine complete set according to an embodiment of the present invention.
Figure 2:
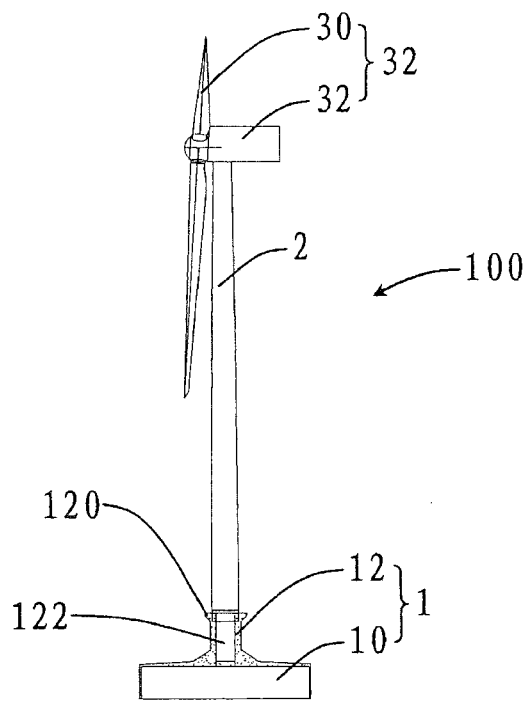
FIG. 2 is a side structural schematic view of the offshore wind turbine complete set shown in FIG. 1.

FIG. 1 illustrates a front structural schematic view of an offshore wind turbine complete set according to an embodiment of the present invention. FIG. 2 illustrates a side structural schematic view of the offshore wind turbine complete set shown in FIG. 1. With reference to FIGS. 1 and 2, the offshore wind turbine complete set 100 according to an embodiment of the present invention comprises a foundation 1, a tower column 2 and a wind turbine set 3. A lower end of the tower column 2 is installed on the foundation 1. The wind turbine set 3 comprising wide turbine blades 30 and a wide turbine head 32 is installed on an upper end of the tower column 2.

Preferably, the tower column 2 is made into a hollow columnar steel-concrete structure with lower cost compared to a pure steel structure, and the mixed clay protection layer of the steel-concrete structure efficiently reduces the corrosion of seawater and salts on the tower column 2. More preferably, the tower column 2 is partly tapered, with the lower diameter larger than the upper diameter. So that the tower column has small dead weight as well as good structural strength, which facilitates the decrease of center of gravity of the complete set 100 while satisfying the strength requirement.

The foundation 1 preferably adopts the steel-concrete structure, which efficiently reduces the corrosion of seawater and salts on the foundation 1 by the mixed clay protection layer, so as to ensure that the structure of the foundation 1 underneath the water and on the wave splash zone needs no maintenance during the life span of the complete set. The foundation 1 is cylindrical, and the center upside a cover of the foundation 1 is fixed with a pile cap 12, and an upper end of the pile cap 12 is provided with an adapter ring 120. The lower end of the tower column 2 is installed on the pile cap 120 by the adapter ring 120. A ballast tank 122 is preferably provided inside the pile cap 12, and seawater or other ballasts may be injected into the ballast tank 122 as needed, so as to increase the dead weight of the foundation 1. The elevation of the adapter ring 120 of the foundation 1 is adjusted via design for force transmission of the foundation 1; so that the offshore wind turbine complete set 100 are suitable for various water depth conditions from the intertidal zone to the profundal zone, with good adaptability for water depth.

In this particular embodiment, the foundation 1 is columnar in its entirety. Preferably, the ratio of the diameter of the column to the height of the offshore wind turbine complete set is not less than 0.3. More preferably, the ratio of the diameter of the column to the height of the offshore wind turbine complete set is not less than 0.2. Therefore, with a large dead weight for the structure of the foundation 1 and low center of gravity for the offshore wind turbine complete set 100, it is convenient for transportation, so that the offshore wind turbine complete set 100 of the present invention may be integrally transported in a vertical manner, and the test is performed before transportation, without separately transporting respective parts of the wind turbine and assembling and testing the wind turbine complete set 100 on the sea. The foundation of the present invention employs a huge structure with big diameter, preferably in the range of about 20-50 meters. The huge cylindrical gravity type composite foundation 1 of the offshore wind turbine of the present invention has advantages of both cylindrical foundation and gravity type foundation, and provides a long horizontal force arm with big diameter, and resists big flexural moment in the limiting condition of the wind turbine and the complex coupling load combined with wind, wave, flow and ice, etc., and lowers the requirements for the bearing capacity of the ground base. Certainly, the present invention is not limited herein, the foundation of the present invention in its entirety may also adopt columns with polygonal cross section, and the ratio of the polygonal span to the height of the offshore wind turbine complete set is not less than 0.3. Preferably, the ratio of the polygonal span to the height of the offshore wind turbine complete set is not less than 0.2. Preferably, the ratio of the height of center of gravity of the complete set to the diameter or the polygonal span of the foundation is not greater than 0.3, so that the complete set has good floatability and stability.

The foundation 1 comprises a plurality of tanks 10. The plurality of tanks 10 are respectively provided with an opening and a switchable through hole (not shown). When the offshore wind turbine complete set 100 floats on water, the openings of the plurality of tanks 10 are underneath the water. The air may be injected into or released from each of the through holes. When the air is injected into the tank 10, the water is discharged from the tank 10 under the action of air pressure, and buoyancy for the foundation increases as the volume of water displaced by the foundation 1 increase according to Archimedes' law. To the contrary, when the air is released from the tank 1, the water enters the tank 10 from the opening, so that the buoyancy for the foundation reduces and the foundation 1 sinks. Therefore, the negative pressure of each tank 10 is controlled by injecting or releasing the air into or from each through hole.

Figure 3:
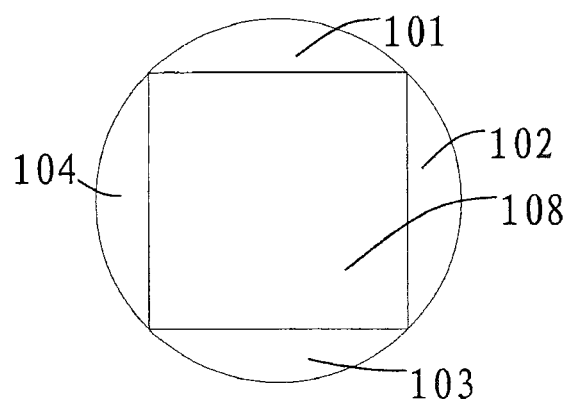
FIG. 3 is a schematic view of foundation tanks of the wind turbine complete set shown in FIG. 1.

In a particular embodiment, the plurality of tanks comprise a middle tank and a plurality of side tanks, and the plurality of side tanks are further away from the center of gravity of the wind turbine complete set, so as to provide uprighting force, and the center of gravity of the offshore wind turbine complete set lies in the center of the middle tank, and moreover, the volume of the middle tank is larger than that of each side tank. In the particular embodiment shown in FIG. 3, the plurality of tanks 10 comprise a middle tank 108 and four side tanks 101, 102, 103, 104. The middle tank 108 has a cross section that is square, and the four side tanks 101, 102, 103, 104 comprising a front side tank 101, a back side tank 103, a left side tank 104 and a right side tank 102 are symmetrically distributed around the middle tank 108. The majority of buoyancy may be provided to the offshore wind turbine complete set by injecting air into the middle tank 108, so that the wind turbine complete set will not sink, and the uprighting force may be provided by injecting an adequate amount of air into the side tanks 101, 102, 103, 104, so as to keep the entire structure in a vertical floating state on the water consistent with the state of installation on the offshore site, but without external force.

Specially, for example, when the offshore wind turbine complete set 100 is deflected to the right side on the sea surface, it is meant that the right side of the offshore wind turbine complete set 100 is heavier, and at this time, the right tank will be provided bigger buoyancy by injecting more air into the right tank 102 through the corresponding through hole, so that the stability for the offshore wind turbine complete set 100 in its entirety is adjusted. Certainly, at this time, part of air may also be released from the left side tank 104 symmetrical to the right side tank 102 through the corresponding through hole, so that more water is injected to the left side tank 104 and thus reduces the buoyancy on the left side to balance the gravity on the right side of the offshore wind turbine complete set 100, which also achieves the purpose of adjusting the stability of the offshore wind turbine complete set 100.

In the case that the offshore wind turbine complete set 100 is deflected to the left, front or back sides on the sea surface, likewise, the stability of the offshore wind turbine complete set 100 is adjusted by respectively adjusting the left side tank 104, the front side tank 101 or the back side tank 103 themselves, or by respectively adjusting the right side tank 102, the back side tank 103 or the front side tank 101 symmetrical to the left side tank 104, the front side tank 101 or the back side tank 103.

Therefore, the design for the tank structure of the foundation 1 of the present invention may increase the floatability and stability of the offshore wind turbine complete set 100, so as to ensure the requirement for the verticality after installation of the offshore wind turbine complete set 100.

Preferably, the wave-resistant and ice-breaking structures may be provided in the position of the pile cap 12 of the foundation 1, so as to weaken the influence of wave nm-up and ice on the foundation.

In a preferred embodiment, internal and external surfaces of the foundation 1 are also provided with a plurality of kinds of pressure sensors (not shown). The pressure sensor may real-time detects the pressure in the corresponding position, so that the posture of the offshore wind turbine complete set 100 is immediately adjusted using the above-mentioned method according to the force distribution detected, thereby keeping the complete set 100 stable.

The offshore wind turbine complete set 100 of the present invention can realize the one-step installation in sequence using the step for prefabrication of the foundation, the step for installation on the dock, the step for transportation and the step for offshore installation. In the step for prefabrication of the foundation, the foundation 1 is fabricated on the land prefabrication site in accordance with the design requirements. In the step for installation on the dock, the foundation 1 is launched and fixed to the dock, and on the dock, the tower column 2 and the wind turbine set 3 are installed on the foundation 1 to assemble into a complete set 100, and the test in a state of the complete set is accomplished. In the step for transportation, the complete set 100 is fixed to the installation vessel by a fixing system, and the wind turbine complete set 100 is transported to the offshore site by the installation vessel, while the air is continuously injected into the foundation 1 to float the complete set 100 on the water, and a pitch sensor and a roll sensor are respectively provided on the foundation 1 and the vessel body, and the installation vessel adjusts the ballast of the vessel body during transportation of the complete set by a control system. In the step for offshore installation, the fixing system is released on the predetermined offshore site, and the complete set 100 is sunk onto the sea bed by gravity in the case the buoyancy for the complete set 100 is reduced by releasing the air inside the vessel body 10 of the foundation 1 via the through hole. The foundation 1 is fixed and the installation is accomplished after levelling the foundation 1 to the design requirement.

Some of methods for sinking and reinforcement of the foundation 1 are disclosed in the prior art, for example, the methods for sinking of the foundation are disclosed in Chinese Invention Patent Application No. 200910244841.6, entitled "a method for sinking of a thick wall cylindrical foundation by injecting air and breaking ground" and Chinese Invention Patent Application No. 200910244849.2, entitled "a method for sinking of a cylindrical foundation by replacing water with air". And the methods for reinforcement of the foundation are disclosed in Chinese Invention Patent Application No. 200910244844.X, entitled "a method for reinforcement of a cylindrical foundation groundwork by replacing water with air" and Chinese Invention Patent Application No. 200910069424.2, entitled "a method for reinforcement of a groundwork based on the cylindrical foundation negative pressure technique", see those applications in detail and it will not be repeated herein any more.

Compared with the conventional offshore wind turbine, the offshore wind turbine complete set of the present invention combines cylindrical structure, gravity type structure and sheet-pile structure, which can bear complex stress and load, and the foundation and the wind turbine set may be integrally assembled on the onshore base, so as to largely shorten the offshore construction and installation time, improve the environment for assembly of the wind turbine set, and ensure the quality of the assembly. And the offshore wind turbine complete set finishes its test operation on the onshore base, which largely shortens the offshore test time. It is possible to realize one-step installation and dismounting for the complete set using the offshore wind turbine complete set of the present invention, which eliminates the need for large hoisting machinery and transportation vessels in the offshore operation for the large offshore wind turbine complete set, the operation can be easily performed with high ratio of success, and greatly reduces the cost relative to the existing technique of installation. Since the foundation, the tower column and the wind turbine set remain in the same posture from fabrication and transportation to use, which minimizes the risk of damage on each components of the wind turbine, and thus lowers the requirements for structural resistance to damage and further reduces the cost of fabrication. Moreover, the technical solutions of the present invention have advantages such as low construction noise, small area of sea bed disturbance, and no pollutant leakage during the offshore operation and are environment-friendly.

What is claimed is:

1. An offshore wind turbine complete set, characterized in comprising:
   a foundation utilizing a steel-concrete structure and including a plurality of tanks which are respectively provided with an opening, wherein the plurality of tanks include a middle tank surrounded by a plurality of side tanks that are symmetrically distributed around the middle tank, wherein the plurality of side tanks are further away from a center of gravity of the offshore wind turbine complete set than the middle tank so as to provide uprighting force, and wherein a volume of the middle tank is larger than the volume of each of the plurality of side tanks;
   a tower column, a lower end of which is installed on a pile cap of the foundation, a ballast tank being provided inside the pile cap of the foundation; and
   a wind turbine set, which is installed on an upper end of the tower column;
   wherein the openings of the plurality of tanks are under water when the offshore wind turbine complete set floats on the water, and the tanks are injected with air or the water, and the buoyancy and uprighting force are provided by the plurality of tanks, so as to keep the entire structure in a vertical floating state on the water consistent with the state of installation on the offshore site, but without external force.

2. The offshore wind turbine complete set according to claim 1, wherein each of the plurality of tanks is provided with a switchable through hole through or from which the air may be injected or released, so as to control negative pressure of each tank.

3. The offshore wind turbine complete set according to claim 1, wherein the center of gravity of the offshore wind turbine complete set lies in a center of the middle tank.

4. The offshore wind turbine complete set according to claim 1, wherein a cross section of the middle tank being square and wherein the side tanks include four side tanks symmetrically distributed around the middle tank.

5. The offshore wind turbine complete set according to claim 2, wherein the foundation is columnar in its entirety, with a ratio of its diameter to a height of the offshore wind turbine complete set not less than 0.2.

6. The offshore wind turbine complete set according to claim 2, wherein the foundation is columnar in its entirety, with a cross section being polygonal and a ratio of the polygonal span to a height of the offshore wind turbine complete set not less than 0.2.

7. The offshore wind turbine complete set according to claim 2, wherein the foundation is cylindrical, and a center upside of a cover of the foundation is fixed with the pile cap, an upper end of which is provided with an adapter ring by which the lower end of the tower column is installed on the pile cap.

8. The offshore wind turbine complete set according to claim 7, wherein the foundation is provided with wave-resistant and ice-breaking structures in a position of the pile cap, so as to weaken an influence of wave run-up and ice on the foundation.

9. The offshore wind turbine complete set according to claim 2, wherein the tower column employs a hollow steel-concrete structure.

10. The offshore wind turbine complete set according to claim 2, wherein internal and external surfaces of the foundation are further provided with a plurality of kinds of pressure sensors.

* * * * *

UNITED STATES PATENT AND TRADEMARK OFFICE
CERTIFICATE OF CORRECTION

PATENT NO.         : 8,770,132 B2
APPLICATION NO.    : 13/380688
DATED              : July 8, 2014
INVENTOR(S)        : Aidong Li et al.

Page 1 of 1

It is certified that error appears in the above-identified patent and that said Letters Patent is hereby corrected as shown below:

In the Specification:
Col. 5, line 55 should read
foundation 1, so as to weaken the influence of wave run-up Signed and Sealed this
Eleventh Day of November, 2014

Michelle K. Lee
*Deputy Director of the United States Patent and Trademark Office*